(12) United States Patent
Nakamura et al.

(10) Patent No.: US 10,828,978 B2
(45) Date of Patent: Nov. 10, 2020

(54) VEHICLE HAVING COOLING DEVICE

(71) Applicant: Toyota Jidosha Kabushiki Kaisha, Toyota (JP)

(72) Inventors: Koichi Nakamura, Miyoshi (JP); Tomoaki Furukawa, Toyota (JP); Kiyonori Takagi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/263,997

(22) Filed: Jan. 31, 2019

(65) Prior Publication Data

US 2019/0232777 A1 Aug. 1, 2019

(30) Foreign Application Priority Data

Feb. 1, 2018 (JP) .................. 2018-016803

(51) Int. Cl.

| | | |
|---|---|---|
| *B60K 11/00* | (2006.01) | |
| *B60K 11/06* | (2006.01) | |
| *B60K 13/02* | (2006.01) | |
| *B60K 11/02* | (2006.01) | |
| *B60K 11/08* | (2006.01) | |
| *B60K 13/04* | (2006.01) | |
| *B60K 11/04* | (2006.01) | |
| *B60K 1/00* | (2006.01) | |

(52) U.S. Cl.
CPC .............. *B60K 11/06* (2013.01); *B60K 11/02* (2013.01); *B60K 11/04* (2013.01); *B60K 11/08* (2013.01); *B60K 13/02* (2013.01); *B60K 13/04* (2013.01); *B60K 1/00* (2013.01); *B60K 2001/006* (2013.01)

(58) Field of Classification Search
CPC .......... B60K 1/04; B60K 11/06; B60K 13/04; B60K 11/08
See application file for complete search history.

(56) References Cited

U.S. PATENT DOCUMENTS

| | | | | |
|---|---|---|---|---|
| 2,194,394 A | * | 3/1940 | KlaviK ................. | B60K 11/08 180/68.1 |
| 7,270,206 B2 | * | 9/2007 | Guertler ................. | B60K 11/06 180/68.1 |
| 8,955,628 B2 | * | 2/2015 | Murray ................. | B60K 11/08 180/68.1 |

(Continued)

FOREIGN PATENT DOCUMENTS

| | | |
|---|---|---|
| JP | 2006103365 A | 4/2006 |
| JP | 2017094771 A | 6/2017 |
| JP | 2018144733 A | 9/2018 |

*Primary Examiner* — Hau V Phan
(74) *Attorney, Agent, or Firm* — Dinsmore & Shohl LLP

(57) ABSTRACT

A vehicle includes a heat exchanging type cooling device comprising an undercover disposed below the cooler body and having an air outlet through which the ambient air discharged through the lower surface of the cooler body is exhausted downwardly into outside atmosphere, the air outlet being formed through the undercover so as to extend in a vertical direction. The undercover is provided with a plurality of fins disposed within the air outlet such that the fins are spaced apart from each other in the longitudinal direction of the vehicle, each of the fins extending in a width direction of the vehicle and being inclined such that a lower end of the fin is located backward of its upper end in the longitudinal direction of the vehicle.

7 Claims, 8 Drawing Sheets

(56) References Cited

U.S. PATENT DOCUMENTS

| | | | |
|---|---|---|---|
| 2003/0037983 A1* | 2/2003 | Hanaya | B60K 13/04 |
| | | | 180/309 |
| 2003/0168267 A1* | 9/2003 | Borroni-Bird | B60G 3/18 |
| | | | 180/68.1 |
| 2004/0231898 A1* | 11/2004 | Hochkoenig | B60K 11/06 |
| | | | 180/68.1 |
| 2013/0168167 A1* | 7/2013 | Matsumoto | B60K 1/04 |
| | | | 180/65.31 |
| 2018/0257482 A1 | 9/2018 | Kondo et al. | |

* cited by examiner

VEHICLE HAVING COOLING DEVICE

CROSS-REFERENCE TO RELATED APPLICATIONS

This application claims priority from Japanese Patent Application No. 2018-016803, filed on Feb. 1, 2018, the entire disclosure of which is herein incorporated by reference in its entirety.

TECHNICAL FIELD

The present disclosure relates to a vehicle wherein a body of a cooling device is disposed backward of rear wheels of the vehicle and in a lower portion of a vehicle body.

BACKGROUND

There is known a vehicle wherein a body of a heat exchanging type cooling device through which a coolant such as an oil or a water flows is disposed backward of rear wheels of the vehicle and in a power portion of the vehicle. JP2017-94771A discloses an example of such a vehicle. In this vehicle, a transaxle to drive the rear wheels is disposed backward of a central portion of a vehicle body, and the body of the cooling device for cooling the coolant in the transaxle is disposed backward of the rear wheels and in the lower portion of the vehicle body. Further, JP2006-103365A describes a cooling technique of a differential pressure air introducing type to cool an electric power source device of a vehicle with ambient air. The vehicle has an air exhaust duct wherein a negative air pressure is generated with an air stream generated during running of the vehicle. The air existing within the electric power source device (the ambient air used to cool the electric power source device) is exhausted into the outside atmosphere through the air exhaust duct, under the negative air pressure within the air exhaust duct, while fresh ambient air is introduced into the electric power source device through an air intake duct.

It is considered desirable that the vehicle provided with the cooling device described above is configured such that the air discharged from the lower surface of the body of the cooling device (hereinafter referred to as "cooler body") disposed in the lower portion of the vehicle body is exhausted downwardly of the vehicle body, for reducing the size of the cooling device and for easy installation of the cooling device on the vehicle body. In this case, there is a risk that foreign matters such as pebble stones and muddy substances splashed by the rear wheels come into collision with the cooler body, causing damaging of the cooler body or clogging of the cooler body, and consequent deterioration of cooling performance of the cooling device. In view of this risk, it is considered to provide an undercover below the cooler body. However, the undercover may disturb a downward flow of the air discharged from the cooler body, giving rise to a risk of prevention to adequately improve the cooling performance of the cooling device. These problems exist where the air discharged from the cooler body disposed in the lower portion of the vehicle body is exhausted downwardly of the cooler body, with respect to the cooling device of the differential pressure air introducing type as well as the cooling device having an air intake duct which has an ambient air inlet open forwardly of the vehicle.

SUMMARY

The present disclosure was made in view of the background art described above. It is therefore an object of the present disclosure to provide a vehicle wherein a cooler body of a cooling device is disposed backward of rear wheels of the vehicle and in a lower portion of the vehicle, and air discharged from a lower surface of the body of the cooling device is exhausted downwardly of the vehicle, so as to effectively protect the cooler body from splashes from the rear wheels while minimizing disturbance of a flow of the discharged air.

The object indicated above is achieved according to the following aspects of the present disclosure.

According to a first aspect of the present disclosure, there is provided a vehicle comprising rear wheels, and a heat exchanging type cooling device through which a coolant flows and which includes a cooler body disposed backward of the rear wheels in a longitudinal direction of the vehicle and in a lower portion of the vehicle, wherein an ambient air introduced into the cooler body to cool the coolant with heat exchanging between the coolant and the ambient air is discharged downwardly through a lower surface of the cooler body, the cooling device comprising an undercover disposed below the cooler body and having an air outlet through which the ambient air discharged through the lower surface of the cooler body is exhausted downwardly into outside atmosphere, the air outlet being formed through the undercover so as to extend in a vertical direction, and wherein the undercover is provided with a plurality of fins disposed within the air outlet such that the fins are spaced apart from each other in the longitudinal direction of the vehicle, each of the fins extending in a width direction of the vehicle and being inclined such that a lower end of the fin is located backward of an upper end of the fin in the longitudinal direction of the vehicle.

In a second aspect of the present disclosure, the vehicle according to the first aspect of the present disclosure is configured such that a length dimension of at least one of the fins which is comparatively distant from the rear wheels is smaller than that of at least one of the fins which is comparatively near the rear wheels.

In a third aspect of the present disclosure, the vehicle according to the first or second aspect of the present disclosure is configured such that the plurality of fins are spaced apart from each other in the longitudinal direction of the vehicle by a predetermined distance.

In a fourth aspect of the present disclosure, the vehicle according to any one of the first, second and third aspect of the present disclosure is configured such that the cooler body has a flat box outer configuration having an upper surface and the lower surface which are located below a floor panel of the vehicle and are substantially parallel to a horizontal plane and each of which has a large area, and the ambient air is introduced into the cooler body through the upper surface, and is discharged from the cooler body through the lower surface.

The upper and lower surfaces of the flat box outer configuration of the cooler body may be substantially parallel opposite two major surfaces of an elongate prism, or substantially parallel opposite end faces of a cylindrical or elliptical pillar having a small height dimension. In some embodiments, the thickness of the prism, or the height of the cylindrical or elliptical pillar is not larger than ½ or not larger than approximately ⅓ of a length of a diagonal line between the opposite two surfaces of the prism in longitudinal cross section, or a diameter of the cylindrical pillar or a dimension of the elliptical pillar along its major axis. The upper and lower surfaces of the flat box outer configuration need not be strictly parallel to each other, and strictly parallel to the horizontal plane, and may be inclined at an angle within a range of ±20° or approximately ±15°, with respect to the longitudinal (running) or transverse (width) direction of the vehicle, depending upon required conditions for installation of the cooler body on the vehicle.

In a fifth aspect of the present disclosure, the vehicle according to any one of the first through fourth aspects of the present disclosure is configured such that the undercover is disposed such that an upper open end of the air outlet is held in fluid-tight contact with the lower surface of the cooler body, so that the ambient air discharged from the cooler body is exhausted through the air outlet into the outside atmosphere, while a fresh ambient air is introduced into the cooler body, under a negative air pressure generated within the air outlet during running of the vehicle. This aspect corresponds to a case where a cooling device of differential pressure air introducing type is provided.

In a sixth aspect of the present disclosure, the vehicle according to the fifth aspect of the present disclosure is configured such that the cooling device further comprises an air intake duct which is disposed in fluid-tight contact with an upper surface of the cooler body and which has an air inlet formed in end portion of the air intake duct, so that the fresh ambient air is introduced through the air inlet into the air intake duct and introduced from the air intake duct into the cooler body through the upper surface when the ambient air discharged from the cooler body is exhausted through the air outlet into the outside atmosphere under the negative air pressure generated at a lower open end of the air outlet.

In the vehicle according to the first aspect of the present disclosure, the undercover disposed below the cooler body has the air outlet which is formed through the undercover so as to extend in the vertical direction and through which the ambient air discharged through the lower surface of the cooler body is exhausted downwardly into the outside atmosphere. The undercover is provided with the plurality of fins disposed within the air outlet such that the fins are spaced apart from each other in the longitudinal direction of the vehicle, and such that each of the fins extends in the width direction of the vehicle and is inclined such that the lower end of the fin is located backward of the upper end in the longitudinal direction of the vehicle. Accordingly, the air discharged through the lower surface of the cooler body can be adequately exhausted into the outside atmosphere along the plurality of fins, and the cooler body can be adequately protected from splashes from the rear wheels, by suitably determining the length dimensions, inclination angles and spacing distances of the plurality of fins.

In the vehicle according to the second aspect of the present disclosure the length dimension of at least one of the fins which is comparatively distant from the rear wheels is smaller than that of at least one of the fins which is comparatively near the rear wheels, a front portion of the cooler body which is comparatively near the rear wheels can be adequately protected from the splashes from the rear wheels, by the fin or fins having the comparatively large length dimension or dimensions. Further, a rear portion of the cooler body which is less likely to be subjected to the splashes and has a comparatively small angle of exposure to the splashes has a reduced air resistance owing to the fin or fins having the comparatively small length dimension or dimensions, so that the air discharged from the cooler body can be more smoothly exhausted into the outside atmosphere, whereby the cooling performance of the cooling device can be improved.

In the vehicle according to the third aspect of the present disclosure the plurality of fins are spaced apart from each other in the longitudinal direction of the vehicle by the predetermined distance, the air discharged from the cooler body can be more adequately exhausted into the outside atmosphere.

In the vehicle according to the fourth aspect of the present disclosure the cooler body has the flat box outer configuration having the upper and lower surfaces having relatively large areas which are located below the floor panel of the vehicle and are substantially parallel to the horizontal plane and each of which has the large area, the ambient air is introduced into the cooler body through the upper surface, and is discharged from the cooler body through the lower surface. Accordingly, the cooler body can be disposed compactly in a small space below the floor panel, and the ambient air for cooling the coolant can efficiently flow into the cooler body through the upper surface and from the cooler body through the lower surface, so that the cooling device has a high degree of air cooling performance.

In the vehicle according to the fifth aspect of the present disclosure, the undercover is disposed such that the upper open end of the air outlet is held in fluid-tight contact with the lower surface of the cooler body, so that the ambient air discharged from the cooler body is exhausted through the air outlet into the outside atmosphere, while a fresh ambient air is introduced from the air intake duct into the cooler body, under a negative air pressure generated within the air outlet during running of the vehicle. The cooling device of the vehicle according to the fifth aspect of the present disclosure is of a differential pressure air introducing type wherein the plurality of fins are disposed within the air outlet such that the fins are spaced apart from each other in the longitudinal direction of the vehicle and are inclined such that the lower end of each fin is located backward of upper end of the fin in the longitudinal direction of the vehicle. Accordingly, the ambient air discharged from the cooler body can be smoothly exhausted into the outside atmosphere, owing to a function of the fins to rectify the stream of the air, and under the negative air pressure within the air outlet, whereby the cooling performance of the cooling device can be improved.

In the vehicle according to the sixth aspect of the present disclosure, the cooling device further comprises the air intake duct which is disposed in fluid-tight contact with the upper surface of the cooler body and which has the air inlet formed in the end portion, so that the fresh ambient air is introduced through the air inlet into the air intake duct and introduced from the air intake duct into the cooler body through the upper surface when the ambient air discharged from the cooler body is exhausted through the air outlet into the outside atmosphere under the negative air pressure generated at the lower open end of the air outlet. Accordingly, the ambient air smoothly flows through the cooler body to efficiently cool the coolant, such that the ambient air introduced into the cooler body through the upper surface flows downwardly through the cooler body, and is discharged from the cooler body through the lower surface.

DETAILED DESCRIPTION

Figure 1:
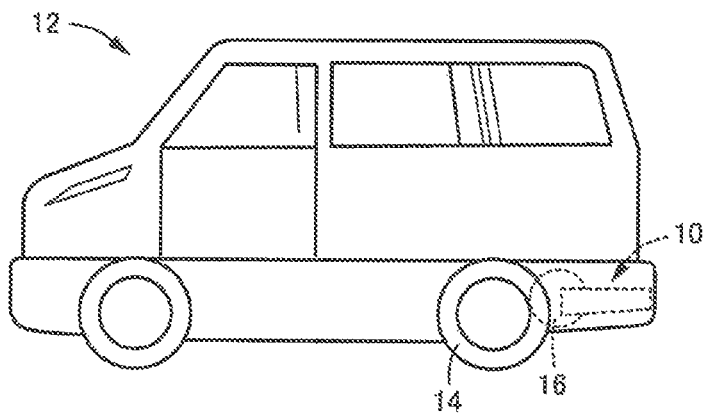
FIG. 1 is a schematic view showing a vehicle according to the present disclosure.

The present disclosure is applicable to various types of vehicles such as: an engine-drive vehicle provided with a drive power source such as a gasoline engine, a diesel engine or any other type of internal combustion engine; an electric vehicle provided with at least one electric motor as a vehicle drive power source; a hybrid vehicle provided with an internal combustion engine and at least one electric motor as a vehicle drive power source; and a fuel-cell type electric vehicle having a fuel cell device as an electric power source for operating at least one electric motor. The cooling device including the cooler body is configured to cool a coolant (cooling medium) such as an oil or water used to cool heat generating components of a vehicle such as an internal combustion engine, at least one electric motor, a battery, an inverter, an electric power source device, an electronic controller, and a power transmitting mechanism including gear trains and a transmission belt.

The present disclosure is applicable suitably to a rear-wheel-drive vehicle of a type in which a drive power source to drive rear drive wheels is disposed in a rear portion of the vehicle, but is applicable also to a rear-wheel-drive vehicle of a type in which the drive power source to drive the rear drive wheels is disposed in a front portion of the vehicle. The present disclosure is further applicable to a front-and-rear-wheel-drive vehicle (a four-wheel or all-wheel drive vehicle), and a front-wheel-drive vehicle in which rear wheels are idler wheels, since those front-and-rear-wheel-drive vehicle and the front-wheel-drive vehicle are also required to protect the cooler body from splashes from the rear wheels. The cooler body is suitably disposed backward of the rear wheels in the running or longitudinal direction of the vehicle, for instance, in a rear portion of the vehicle, but may be disposed in between the rear wheels in the width or transverse direction of the vehicle.

The present disclosure is applicable to a vehicle having a cooling device of a differential pressure air introducing type in which a negative air pressure is generated within a downward opening of an air outlet of the cooling device, due to an air stream during running of the vehicle. The cooling device may be provided with an air intake duct having an air inlet through which the ambient air is introduced. The air inlet is open backward, upward, downward, rightwards or leftwards of the vehicle, but may be open forwardly of the vehicle. The cooling device need not be of the differential pressure air introducing type, and may be configured to simply introduce an ambient air stream during running of the vehicle, or introduce the ambient air with an operation of an electric fan.

For example, the cooler body has a flat box outer configuration having upper and lower surfaces which are located below a floor panel of the vehicle and are substantially parallel to a horizontal plane and each of which has a large area. The ambient air is introduced into the cooler body through the upper surface, and is discharged downwardly through the lower surface. However, the cooler body may be an elongate box having a comparatively large length in the longitudinal direction of the vehicle. However, a shape, an attitude of installation, a position of an ambient air inlet and other specifications of the cooler body are suitably determined according to specific conditions of installation of the cooler body on the vehicle. Although the cooler body is a single body member disposed below the floor panel of the vehicle, the cooler body may consist of a plurality of body members. Where the vehicle according to the present disclosure is an electric vehicle not provided with an engine, an air intake duct may be attached to an opening of a bumper designed for an engine-drive vehicle, which opening is held in communication of an exhaust pipe of the engine-drive vehicle. While the cooler body is suitably disposed below the floor panel of the vehicle, the cooler body may be disposed otherwise, for instance, along a side surface of the vehicle extending in its longitudinal direction or along a cross member parallel to the width direction of the vehicle.

The cooler body is disposed backward of the rear wheels of the vehicle, and the undercover includes at least a lower portion of the cooler body, and may extend to a position located forwardly of the rear wheels, or to a position located backward of the cooler body, so as to reduce an air resistance within the undercover, for example. The air intake duct (which may be an air intake duct of the cooling device of a differential pressure air introducing type) through which the ambient air is introduced into the cooler body is installed in fluid-tight contact on the upper surface of the cooler body, for example. In some embodiments, the air intake duct may be connected to the front or rear end surface of the cooler body. The air intake duct may also extend to a position located forwardly of the rear wheels, or to a position located backward of the cooler body. The cooler body is provided with the air intake duct, as needed, but may not be provided with the air intake duct where the cooler body is configured to receive the ambient air directly through the upper surface.

The undercover is formed of a synthetic resin material such as polypropylene (PP), for example, with a plurality of integrally formed fins. In some embodiments, the undercover may consist of a plurality of members connected to each other, or may incorporate metallic inserts or sheets inserted into or bonded to its selected parts. Further, the undercover may be formed of a metallic material, or may consist of a combination of a metallic member and a synthetic resin member. The above descriptions with respect to the undercover may apply to the air intake duct for introducing the ambient air into the cooler body. For example, the cooler body is fixed to the floor panel, a cross member or any other member of the vehicle body, while the undercover and the air intake duct are fixed to the cooler body. However, the undercover and the air intake duct may be fixed directly to the floor panel, cross member, bumper or any other member of the vehicle body.

The number of the fins provided within the air outlet, and the length dimensions, inclination angle and spacing distance of the fins are suitably determined on the basis of the positions of the fins relative to the rear wheels, and so as to minimize the disturbance of the downward air flow through the air outlet, while preventing entry of the muddy substances and other foreign matters splashed by the rear wheels, for example, such that all of straight lines from points in the entire area of the lower surface of the cooler body, which straight lines are tangent to the outer circumference of the rear wheels, extend through any one of the fins. In some embodiments, the angle at which the fins are inclined downwardly with respect to the horizontal plane as the fins extend backward in the longitudinal direction of the vehicle is selected within a range between approximately 30° to 60°. In some embodiments, the inclination angle is not limited to within this range. Further, the inclination angle of the fins may be changed continuously or in steps. Furthermore, the fins may be curved (along a part of an arc of a cylinder) so as to have a downwardly convex configuration. However, the fins may take the form of a flat plate or sheet, or any one of other various form, for instance, a plate or sheet which is bent at one position or a plurality of positions in the longitudinal direction of the vehicle.

The length dimensions of the fins between their upper and lower ends may be changed continuously or in steps such that the length dimensions of the fins comparatively distant from the rear wheels are smaller than those of the fins comparatively near the rear wheels. However, all of the fins may have a predetermined same length dimension, irrespective of the positions of the fins in the longitudinal direction of the vehicle. In some embodiments, the plurality of fins are spaced apart from each other in the longitudinal direction of the vehicle by a predetermined constant distance. In some embodiments, the distance of spacing of the adjacent fins may be changed continuously or in steps. Further, the plurality of fins may be disposed such that the adjacent fins partially overlap each other in the longitudinal direction of the vehicle. The fins may be merely fixed to inner walls of the air outlet which are opposite to each other in the width direction of the vehicle, but may be further connected to each other by at least one reinforcing rib (connecting plate) in the form of a vertical plate, which is located in an intermediate portion of the width of the vehicle, and disposed so as to extend in the longitudinal direction of the vehicle.

Embodiments of the present disclosure will be described in detail by reference to the drawings. It is to be understood that the drawings showing the embodiments are simplified or transformed as needed, and do not necessarily accurately represent dimensions and shapes of various elements of the embodiments.

Reference is first made to FIG. 1, which is the schematic view of a vehicle 12 provided with a cooling device 10. The vehicle 12 is an electric vehicle of a fuel cell type having a fuel cell device, an electric motor M (shown in FIG. 2) and rear wheels 14. The fuel cell device generates an electric power with which the electric motor M is operated to generate a drive force for driving the rear wheels 14 for running of the vehicle 12. The fuel cell device includes a hydrogen tank 16 charged with a hydrogen used as a fuel. The hydrogen tank 16 and the cooling device 10 are disposed backward of the rear wheels 14 as viewed in a running or longitudinal direction of the vehicle 12. The cooling device 10 is configured to cool a coolant in the form of an oil, with heat exchanging between the oil and an ambient air. The cooled oil is supplied to the electric motor M, a transaxle, an electric power source device, etc. for cooling these components of the vehicle 12. The electric motor M as well as the hydrogen tank 16 and the cooling device 10 are disposed near the rear wheels 14 in the longitudinal direction of the vehicle 12. Thus, the vehicle 12 according to the present disclosure is a rear-wheel-drive vehicle of a type wherein a drive power source is disposed in a rear portion of the vehicle. The cooling device 10 consists of a pair of right and left units disposed on respective right and left sides of the vehicle 12. These two units are substantially symmetrical in construction with each other in the width direction of the vehicle 12. Hereinafter, the right unit of the cooling device 10 will be described in detail.

Figure 2:
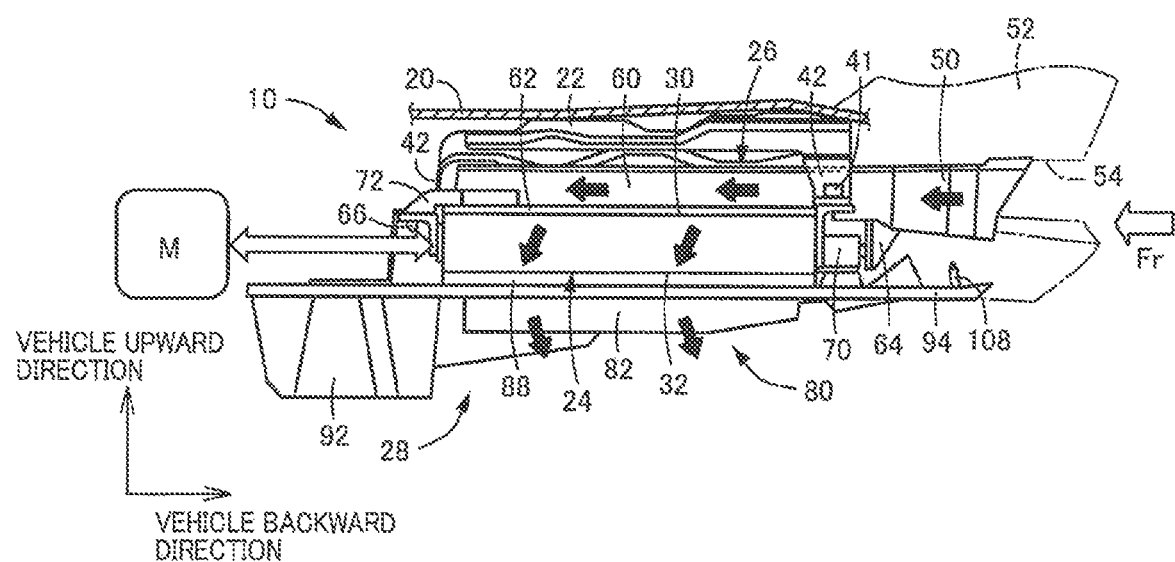
FIG. 2 is a left side elevational view of a cooling device of the vehicle of FIG. 1.
Figure 3:
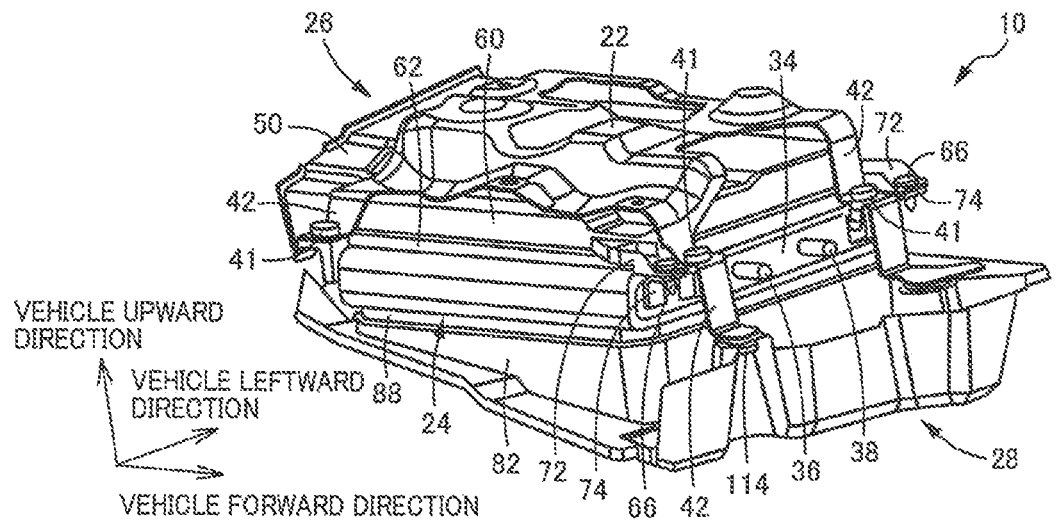
FIG. 3 is a perspective view of the cooling device of FIG. 2 as seen backward of the vehicle in an obliquely leftward and downward direction of the vehicle.
Figure 4:
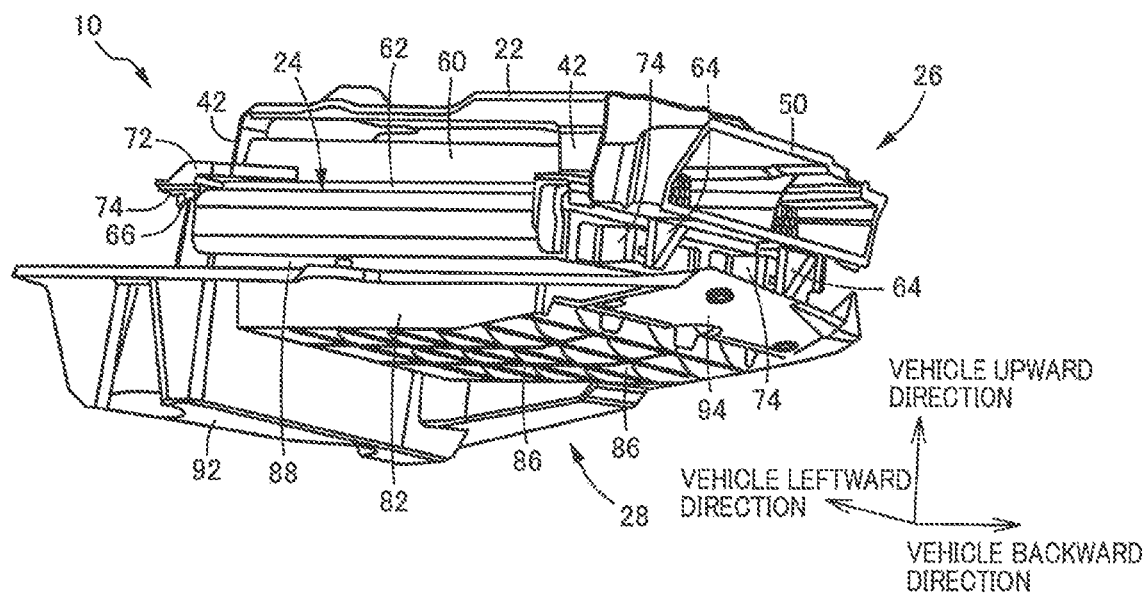
FIG. 4 is a perspective view of the cooling device of FIG. 2 as seen forwardly of the vehicle in an obliquely rightward and upward direction of the vehicle.
Figure 5:
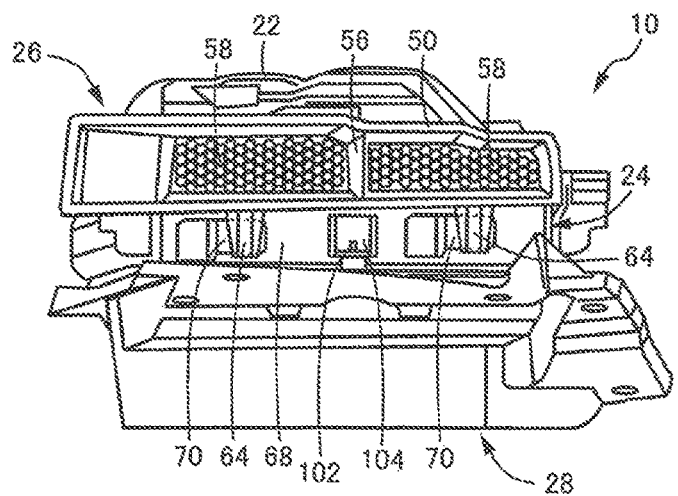
FIG. 5 is a rear end elevational view of the cooling device of FIG. 2 as seen forwardly of the vehicle in the horizontal direction.

FIG. 2 is the left side elevational view of the cooling device 10 of the vehicle 12 of FIG. 1. The cooling device 10 is disposed below a floor panel 20 of the vehicle 12, and is attached to a lower surface of the floor panel 20 through a metallic cooler attachment bracket 22. FIG. 3 is the perspective view of the cooling device 10 as seen backward of the vehicle 12 in an obliquely leftward and downward direction of the vehicle 12, and FIG. 4 is the perspective view of the cooling device 10 as seen forwardly of the vehicle 12 in an obliquely rightward and upward direction of the vehicle 12, while FIG. 5 is the rear end elevational view of the cooling device 10 as seen forwardly of the vehicle 12 in the horizontal direction. The cooling device 10 includes a cooler body 24, an air intake duct 26 for introducing the ambient air into the cooler body 24, and an undercover 28 disposed below the cooler body 24 to protect the cooler body 24 from muddy substances and other foreign matters splashed from the rear wheels 14. The air intake duct 26 functions as an ambient air intake duct for introducing the ambient air into the cooler body 24, and the undercover 28 also functions as an air exhaust duct for receiving the air discharged downwardly from the cooler body 24 and exhausting the air downwardly of the cooler body 24.

The cooler body 24 is formed of a metallic material such as an aluminum casting, and has a flat box outer configuration, more specifically, a thin rectangular parallelepiped. The cooler body 24 has substantially horizontally extending rectangular upper and lower surfaces 30 and 32 each having a large area. A rectangle of each of the upper and Lower surfaces 30 and 32 has opposite sides (longer sides, for example) parallel to the running or longitudinal direction of the vehicle 12. The rectangular parallelepiped of the cooler body 24 is defined such that their rectangular upper and lower surfaces 30 and 32 are substantially parallel to each other, and such that a height of the cooler body 24 is, without limitation, not larger than ⅓ of a length of a diagonal line of the above-indicated rectangle. The cooler body 24 has at least one coolant flow passage (conduit) formed over an entire area of the rectangular parallelepiped, so that the oil serving as the coolant flows through the coolant flow passage. The ambient air introduced into the cooler body 24 through a substantially entire area of the rectangular upper surface 30 flows around the coolant flow passage, and is discharged downwardly through a substantially entire area of the rectangular lower surface 32, whereby the oil within the coolant flow passage is cooled with heat exchanging between the oil and the ambient air. The cooler body 24 has a pair of connecting ports 36 and 38 on a front surface, one of which is connected to an oil supply conduit through which the oil is supplied to the electric motor M and other devices to be cooled, and the other of which is connected to an oil return conduit through which the oil is returned from the devices to be cooled.

Figure 15:
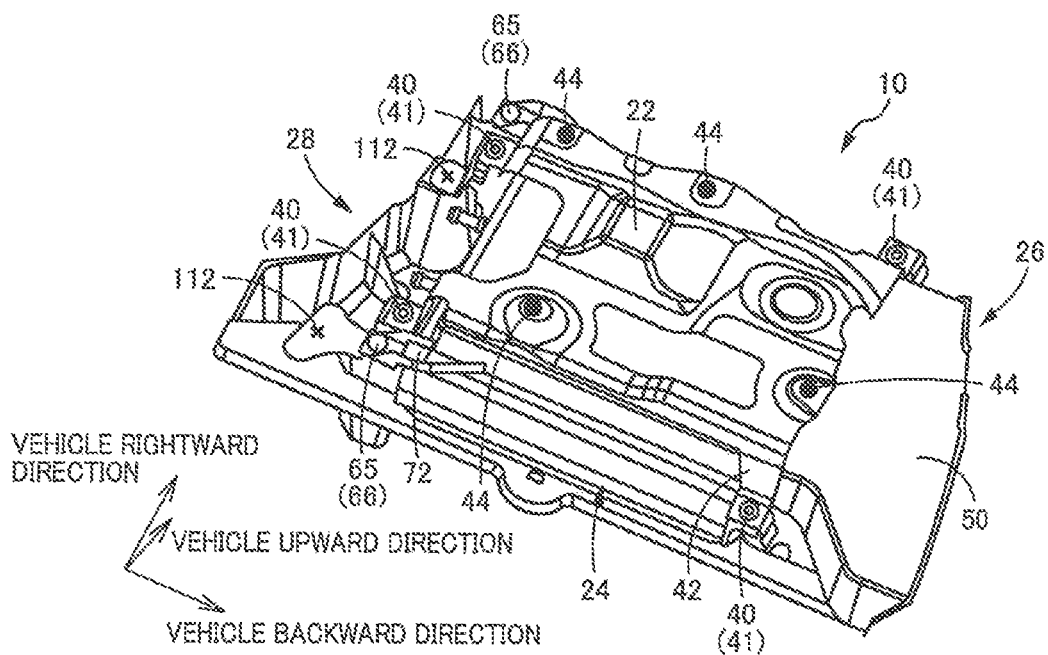
FIG. 15 is a perspective view of the cooling device of FIG. 2 as seen downwardly of the vehicle in an obliquely rightward direction of the vehicle.

The cooler body 24 has four cooler fixing portions 40 shown in FIG. 15, and is fixed to the cooler attachment bracket 22 with metallic fixing bolts 41 (shown in FIG. 3 as well as in FIG. 15) provided at the cooler fixing portions 40. The cooler attachment bracket 22 is provided with two front arm portions 42 at two right and left front portions and two rear arm portions 42 at two right and left rear portions, as viewed in the running direction of the vehicle 12, such that the right and left front and rear arm portions 42 are disposed on respective right and left sides of the air intake duct 26, and such that the arm portions 42 extend downwardly of the air intake duct 26. The arm portions 42 are superposed on L-shaped metallic bracket members and fastened to the metallic bracket members with the fixing bolts 41 and nuts. The cooler attachment bracket 22 is fixed to the floor panel 20 with metallic fixing bolts (not shown) at four bracket fixing portions 44 shown in FIG. 15. FIG. 15 is the perspective view of the cooling device 10 as seen downwardly of the vehicle 12 in a rightward and downward direction of the vehicle 12.

The air intake duct 26 is a hollow structure formed of a synthetic resin material such as polypropylene (PP), and is disposed above the cooler body 24 such that a front portion of the air intake duct 26 as seen in the running direction of the vehicle 12 is superposed on the cooler body 24. A rear portion of the air intake duct 26 extends backward from the cooler body 24 in the running direction of the vehicle 12, and has an air inlet 50 through which the ambient air is introduced into the air intake duct 26. The rear portion of the air intake duct 26 is accommodated within an opening 54 formed in a rear bumper 52 of the vehicle 12, such that a rear end of the rear portion is located close to the rear end of the vehicle 12. The opening 54 may be an opening for an exhaust pipe provided on an engine drive vehicle, for instance.

Figure 6:
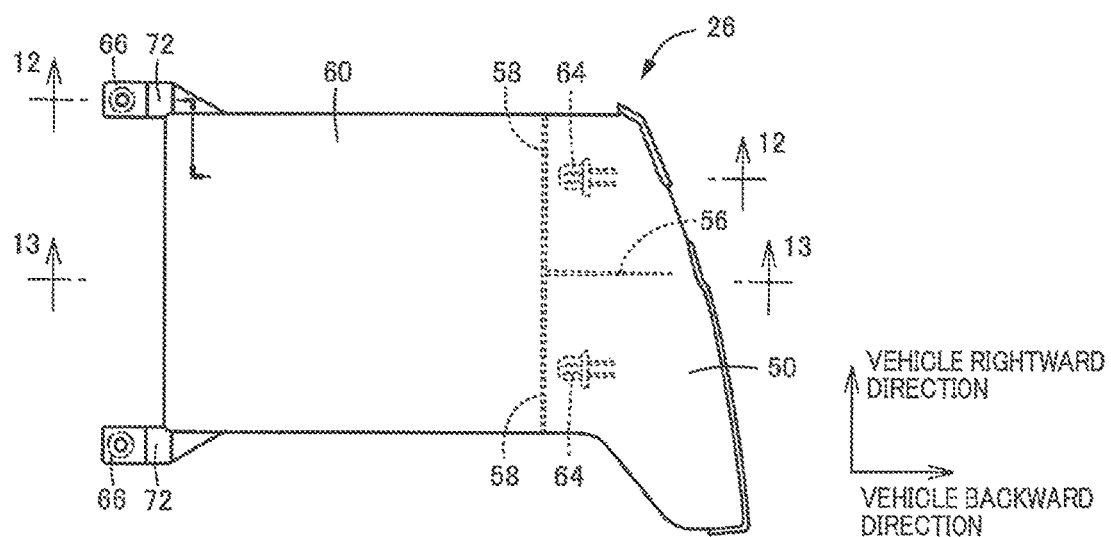
FIG. 6 is a plan view of an air intake duct of the cooling device of FIG. 2.
Figure 7:
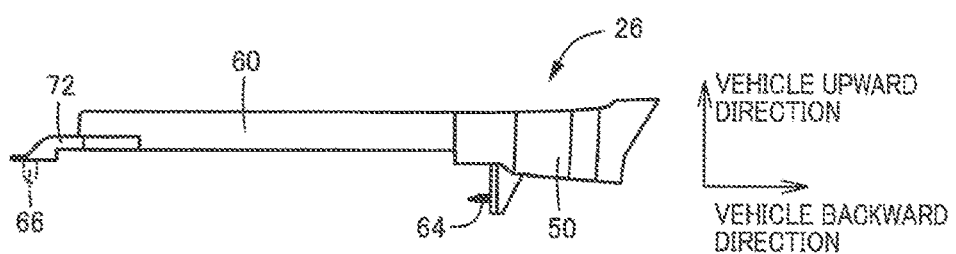
FIG. 7 is a left side (lower side as seen in FIG. 6) elevational view of the air intake duct of FIG. 6.
Figure 12:
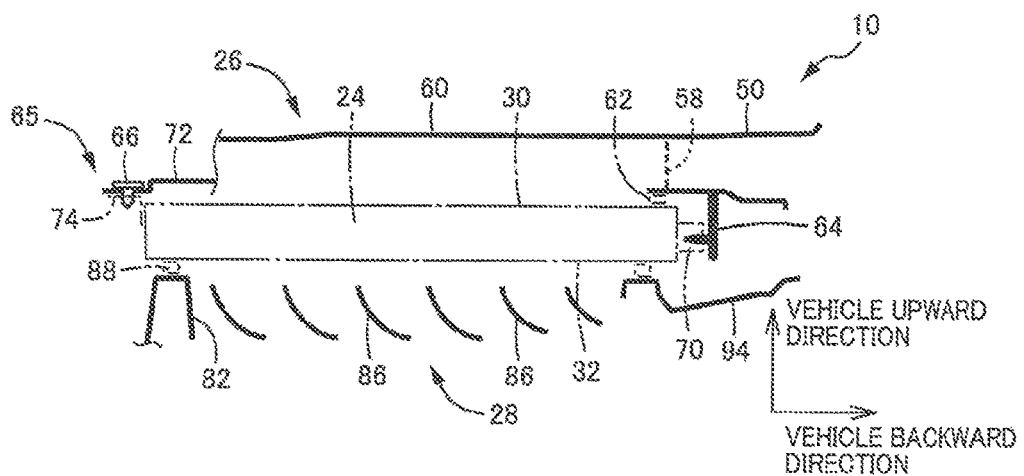
FIG. 12 is a cross sectional view of the cooling device of FIG. 6 taken in a direction along a line 12-12 of FIG. 6.
Figure 13:
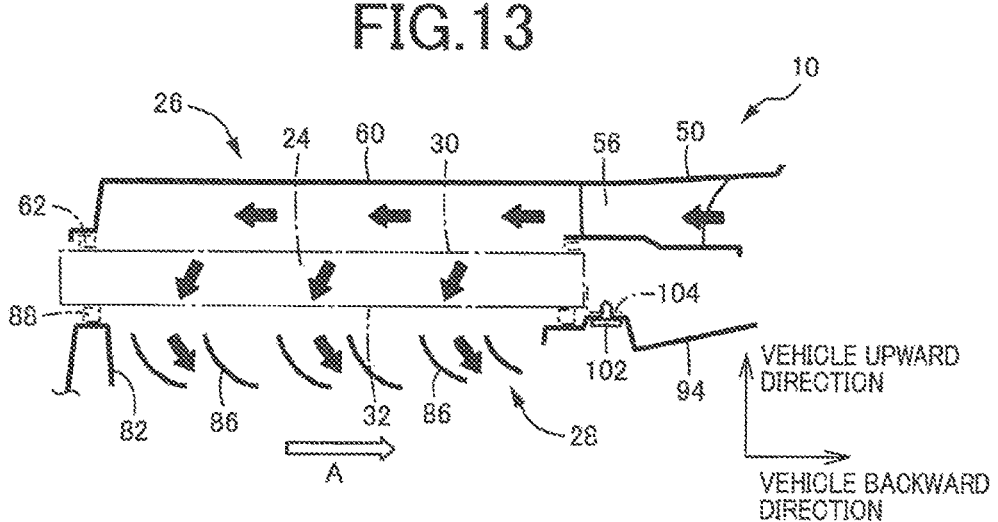
FIG. 13 is a cross sectional view of the cooling device of FIG. 6 taken in a direction along a line 13-13 of FIG. 6.

FIG. 6 is the plan view of the air intake duct 26, and FIG. 7 is the left side (lower side as seen in FIG. 6) elevational view of the air intake duct 26. FIG. 12 is the cross sectional view of the cooling device 10 taken in a direction along a line 12-12 of FIG. 6, and FIG. 13 is the cross sectional view of the cooling device 10 taken in a direction along a line 13-13 of FIG. 6. The air intake duct 26 is a generally flat box hollow rectangular parallelepiped, and is partially superposed on the cooler body 24 such that the air intake duct 26 is movable relative to the cooler body 24 in the forward direction of the vehicle 12, when a load is applied to the air intake duct 26. Described more specifically, the air intake duct 26 is positioned such that the air intake duct 26 does not overlap the cooler body 24 in the vertical direction in the rear end elevational view of FIG. 5 as seen forwardly of the vehicle 12, so that the air intake duct 26 is movable in the forward direction of the vehicle 12 on the cooler body 24. The air inlet 50 is divided into right and left parts by a partition plate 56, and has integrally formed mesh-type strainers 58 disposed therein, to prevent entry of foreign matters into the air inlet 50.

The front portion of the air intake duct 26 superposed on the upper surface 30 functions as an air inlet portion 60 open downwardly to introduce the ambient air into the cooler body 24. The air inlet portion 60 covers a substantially entire area of the upper surface 30 of the cooler body 24, so that the ambient air is introduced into the cooler body 24 from the air intake duct 26 through the substantially entire area of the upper surface 30, for instance, without limitation, not smaller than 80% of the entire area in which the at least one coolant flow passage is formed. Between the air inlet portion 60 and the upper surface 30 of the cooler body 24, there is interposed a sealing member 62 such as a packing in the form of a rectangular frame, so that the air inlet portion 60 is fluid-tightly connected to the upper surface 30 through the sealing member 62. Thick arrow-headed lines in FIG. 13 represent flow paths of the ambient air along which the ambient air introduced into the air intake duct 26 through the air inlet 50 is introduced into the cooler body 24 through the air inlet portion 60, flows through the cooler body 24, and is discharged downwardly from the cooler body 24. Thick arrow-headed lines in the side elevational view of FIG. 2 represent flow paths of the ambient air substantially identical with those in FIG. 13.

Figure 16:
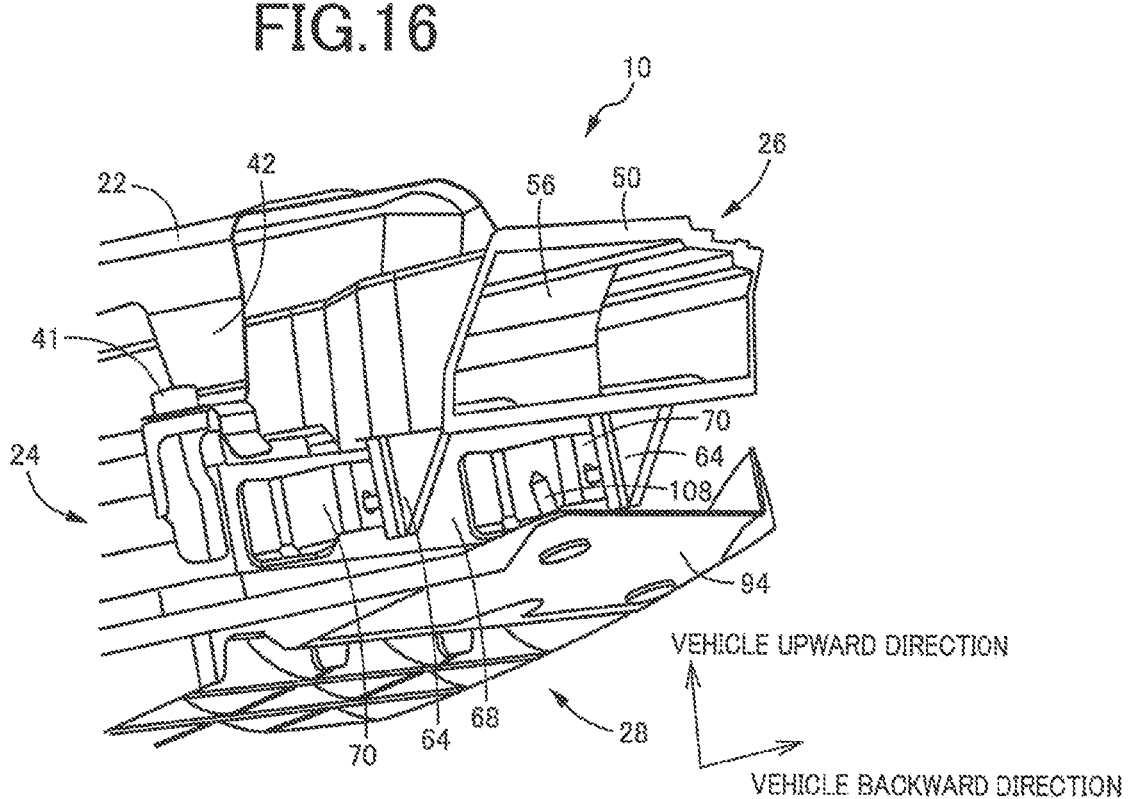
FIG. 16 is a perspective view of a rear portion of the cooling device of FIG. 2 as seen forwardly of the vehicle in an obliquely rightward and upward direction of the vehicle.

The air intake duct 26 constructed as described above is attached to the cooler body 24, with a pair of engaging jaws 64 shown in FIG. 4 and a pair of resin clips 66 shown in FIG. 15. The engaging jaws 64 are formed integrally with the lower surface of the air inlet 50 such that the two engaging jaws 64 are spaced apart from each other in the direction of width of the vehicle 12, while the resin clips 66 are fixed in respective clip fitting portions 65 also shown in FIG. 15. The cooler body 24 has a pair of attaching brackets 70 fixed to a rear surface 68 of the cooler body 24 as shown in FIG. 16. The attaching brackets 70 have respective engaging holes or slits for engagement with protrusions of the engaging jaws 64, such as jaw portions of the engaging jaws 64 which protrude in the forward direction of the vehicle 12, so that a portion of the air intake duct 26 in which the air inlet 50 is formed is prevented from being removed upwardly from the cooler body 24. FIG. 16 is the perspective view of the rear portion of the cooling device 10 as seen forwardly of the vehicle 12 in an obliquely rightward and upward direction of the vehicle 12. The two resin clips 66 are pre-fixed to respective right and left attaching arms 72 formed integrally with the rear portion of the cooling device 10 as seen in the running direction of the vehicle, and the attaching arms 72 are superposed on respective attaching brackets 74 fixed to the front surface 34 of the cooler body 24. In this state, the resin clips 66 are pressed into and through engaging holes formed in the attaching brackets 74, with temporary elastic reduction of diameters of the resin clips 66. Diameters of end portions of the resin clips 66 which have passed the engaging holes are elastically enlarged so that the resin clips 66 are fixed to the attaching brackets 74 such that the resin clips 66 are not removable from the engaging holes. Thus, the air intake duct 26 can be easily attached to the cooler body 24, with a single pressing action of each resin clip 66. Thickness, elasticity, material and other specifications of the sealing member 62 described above are suitably determined so as to ensure desired fluid tightness between the air inlet portion 60 and the upper surface 30 of the cooler body 24. It is noted that the resin clips 66 may be pressed into the engaging holes formed in the attaching arms 72 and the attaching brackets 74 which have been superposed on each other.

A strength of attachment of the air intake duct 26 to the cooler body 24 with the pair of engaging jaws 64 formed of a resin material and the pair of resin clips 66 is sufficiently lower than a strength of attachment of the cooler attachment bracket 22 to the cooler body 24 with the fixing bolls 41 formed of a metallic material. Described in detail, upon application of an impact load Fr to the air inlet 50 of the air intake duct 26 upon collision of the vehicle 12 with a vehicle following the vehicle 12, or with an object during backward running of the vehicle 12 as shown in FIG. 2, some of the engaging jaws 64, the resin clips 66 and the attaching arms 72 are broken, so that the air intake duct 26 is removed from the cooler body 24 and moved forwardly of the vehicle 12, before the cooler body 24 is damaged, whereby the impact load Fr acting on the cooler body 24 is reduced. Accordingly, the present cooling device 10 permits reduction of damaging of the cooler body 24 and prevention of leakage of the oil upon comparatively light collision of the vehicle 12 with the vehicle following the vehicle 12 or the object located backward of the vehicle 12, without direct collision of the cooler body 24 with the other vehicle or the backward object.

Figure 8:
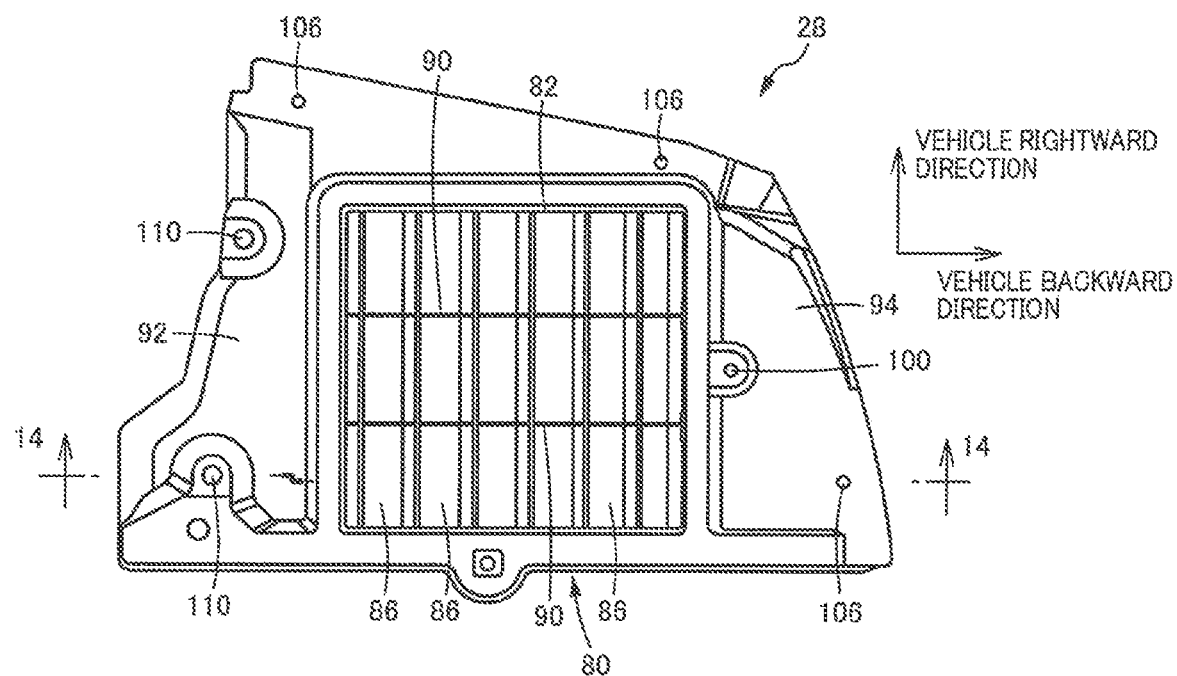
FIG. 8 is a plan view of an undercover of the cooling device of FIG. 2.
Figure 9:
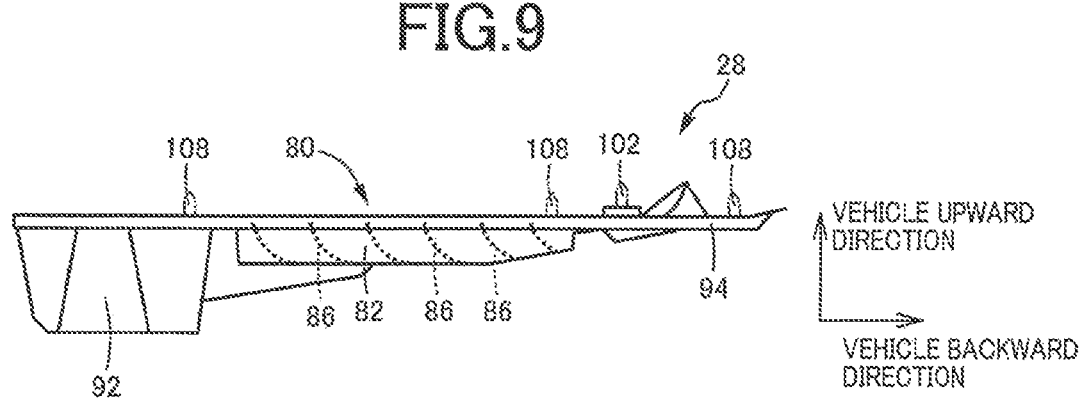
FIG. 9 is a left side (lower side as seen in FIG. 8) elevational view of the undercover of FIG. 8.
Figure 10:
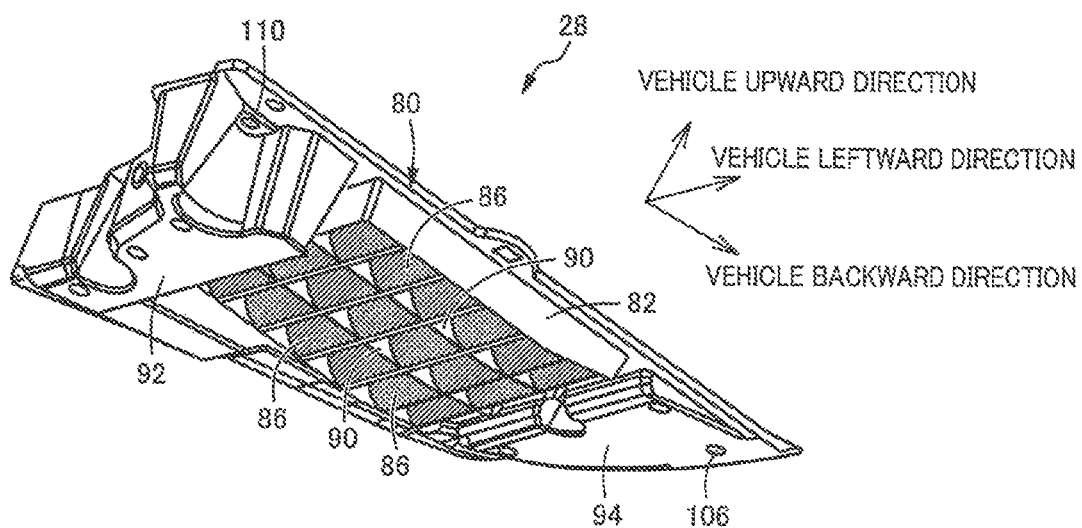
FIG. 10 is a perspective view of the undercover as seen backward of the vehicle in an obliquely rightward and upward direction of the vehicle.
Figure 11:
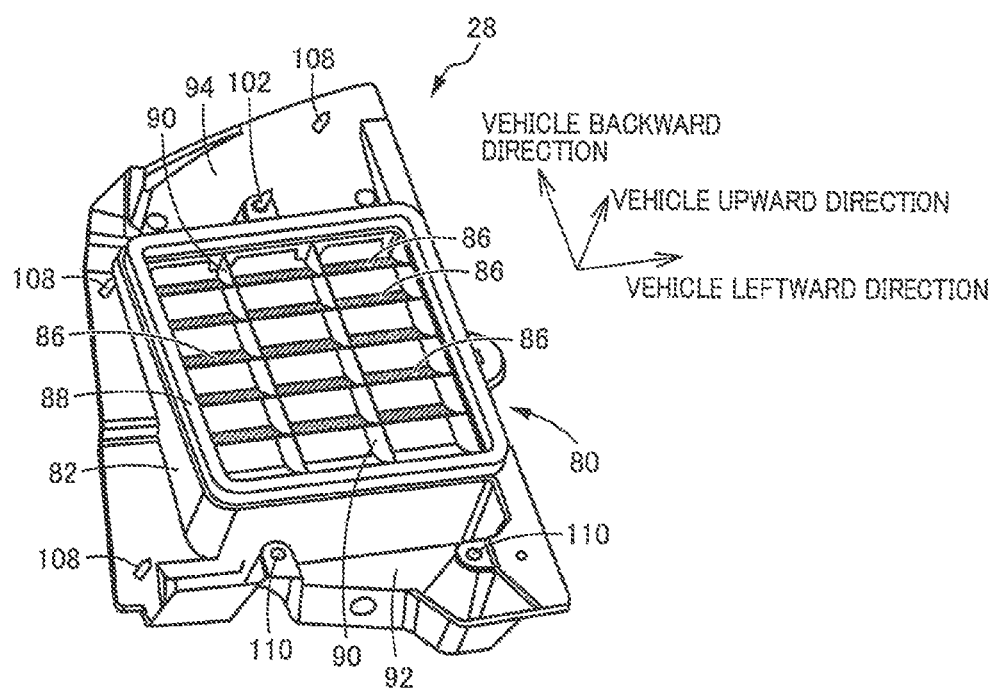
FIG. 11 is a perspective view of the undercover as seen backward of the vehicle in an obliquely leftward and downward direction of the vehicle, when the undercover is provided with a sealing member and a resin clip.
Figure 14:
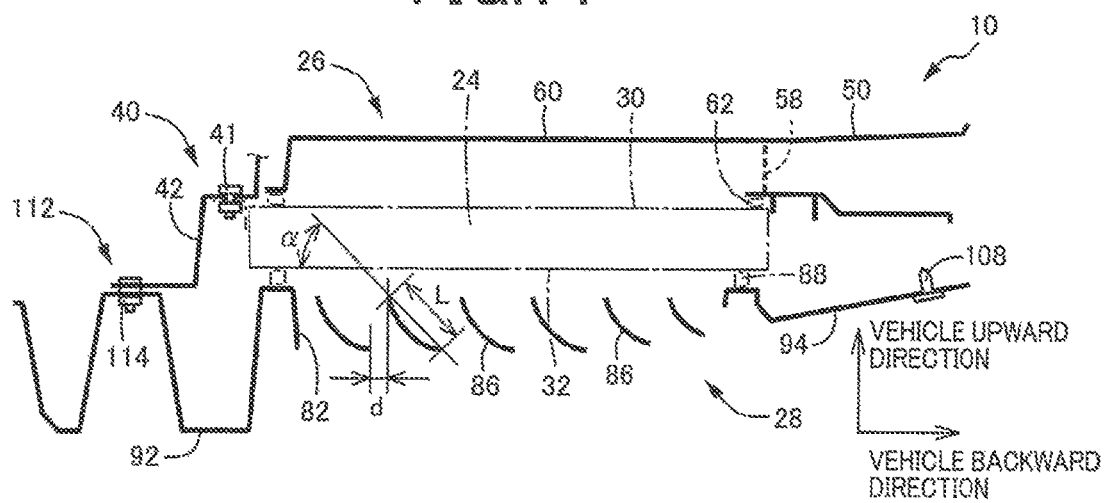
FIG. 14 is a cross sectional view of the cooling device of FIG. 6 taken in a direction along a line 14-14 of FIG. 8.

The undercover 28 functioning also as an air exhaust duct is formed of a synthetic resin material such as polypropylene (PP), and is disposed below the cooler body 24 such that an intermediate portion 80 of the undercover 28 as seen in the running direction of the vehicle 12 is superposed on the cooler body 24. FIG. 8 is the plan view of the undercover 28, and FIG. 9 is the left side (lower side as seen in FIG. 8) elevational view of the undercover 28. FIG. 10 is the perspective view of the undercover 28 as seen backward of the vehicle 12 in an obliquely right ward and upward direction of the vehicle 12. FIG. 11 is the perspective view of the undercover 2S as seen backward of the vehicle 12 in an obliquely leftward and downward direction of the vehicle 12, and FIG. 14 is the cross sectional view of the cooling device 10 taken in a direction along a line 14-14 of FIG. 8. The undercover 28 has a generally flat box configuration, and is disposed below the cooler body 24 such that the cooler body 24 and the undercover 28 are superposed on each other, and such that the undercover 28 is movable relative to the cooler body 24 upon application of a load to the undercover 28. The intermediate portion 80 disposed below the cooler body 24 is a portion also functioning as the air exhaust duct, and has an air outlet 82 formed therethrough in the vertical direction. The air discharged from the lower surface 32 of the cooler body 24 is exhausted downwardly through the air outlet 82 into the outside atmosphere. The air outlet 82 has a rectangular frame profile corresponding to the rectangular shape of the lower surface 32 of the cooler body 24. Within the air outlet 82, there are disposed a plurality of fins (in this embodiment, six fins) 86 extending substantially parallel to the width direction of the vehicle 12, for protecting the cooler body 24 from muddy substances splashed from the rear wheels 14.

Between an upper open end of the air outlet 82 and the lower surface 32 of the cooler body 24, there is interposed a sealing member 88 such as a packing in the form of a rectangular frame, as shown in FIG. 11, so that the air outlet 82 is fluid-tightly connected to the lower surface 32 through the sealing member 88. The air discharged through a substantially entire area of the lower surface 32, for instance, without limitation, not smaller than 80% of the area in which the coolant flow passage is formed flows into the air outlet 82. FIG. 11 is the perspective view of the undercover 28 with the sealing member 88 as seen backward of the vehicle 12 in an obliquely leftward and downward direction of the vehicle 12. The sealing member 88 is installed in position at the upper open end of the air outlet 82, with an adhesive, for example, such that an upper surface of the sealing member 88 is held in pressed fluid-tight contact with the lower surface 32 of the cooler body 24. A negative air pressure is generated at a lower open end of the air outlet 82 in the form of a rectangular frame, due to an air stream A (indicated by a white arrow-headed line in FIG. 13) generated during running of the vehicle 12, so that the air discharged from the lower surface 32 of the cooler body 24 is exhausted downwardly through the air outlet 82, as indicated by thick black arrow-headed lines in FIG. 13, while the fresh air is introduced into the cooler body 24 through the air inlet 50 of the air intake duct 26. Thus, the cooling device 10 of the vehicle 12 according to the present disclosure is of the differential pressure air introducing type.

The plurality of fins 86 are configured to protect the cooler body 24 from muddy substances and pebble stones splashed by the rear wheels 14, while permitting the air discharged from the cooler body 24 to be exhausted downwardly. As shown in FIG. 14, the fins 86 are inclined at a predetermined same angle α with respect to the horizontal plane such that a lower end of the fin 86 is located backward of an upper end of the fin 86 in the longitudinal direction of the vehicle 12. Further, the fins 86 are spaced apart from each other in the longitudinal direction of the vehicle 12, by a predetermined distance d which is determined so as to minimize disturbance of the air flow through the air outlet 82, while preventing entry of the muddy substances and other foreign matters splashed by the rear wheels 14 such that two adjacent fins 86 in the vehicle longitudinal direction are not overlapped each other in the vehicle vertical direction. Furthermore, the fins 86 are curved so as to have a downwardly convex configuration, and have different length dimensions L between an upper and a lower ends of each of the fins 86 determined such that the length dimensions L of the fins 86 comparatively distant from the rear wheels 14 are smaller than those of the fins 86 comparatively near the rear wheels 14, more specifically, such that the four front fins 86 have substantially the same length dimension L while two rear fins 86 have smaller length dimensions than the four front fins 86 and the rearmost one of the two rear fins 86 less likely to be subjected to exposure to the splashed muddy substances has the smaller length dimension L than the other of the two rear fins 86. The fins 86 have distances of downward extension from the level of the upper end of the air outlet 82, which are determined according to their length dimensions L. The above-indicated four front fins 86 have the same distance of downward extension from the level of the upper end to the level of the lower end of the air outlet 82.

The inclination angle α, distances d and length dimensions L of the fins 86 are suitably determined so as to minimize the disturbance of the air flow through the air outlet 82 while preventing the entry of the muddy substances and other foreign matters splashed by the rear wheels 14, for example, such that all of straight lines from points in the entire area of the lower surface 32 of the cooler body 24, which are tangent with the outer circumference of the rear wheels 14, extend through any one of the fins 86. In some embodiments, the inclination angle α is within a range between 30° and 60°. In some other embodiments, the inclination angle α is approximately 45°. Further, in some embodiments, the distance d is within a range between 5 mm and 20 mm. In some other embodiments, the distance d is approximately 10 mm. Further, the fins 86 are integrally fixed to inner walls of the air outlet 82 which are opposite to each other in the width direction of the vehicle 12, and are connected to each other by two reinforcing ribs 90 each in the form of a vertical plate, which are located in an intermediate portion of the width of the vehicle 12 and disposed so as to extend in the longitudinal direction of the vehicle 12.

Hatching lines with a small spacing distance in FIGS. 10 and 11 indicate the fins 86, for easier distinction from the other components of the undercover 28. FIG. 10 shows lower surfaces as outer curved surfaces of the fins 86, while FIG. 11 shows upper surfaces as inner curved surfaces of the fins 86. As shown in FIG. 10, that is, as seen backward of the vehicle 12 in the obliquely upward direction of the vehicle 12 (as seen from around the rear wheel 14), the plurality of fins 86 are arranged continuously with each other in the longitudinal direction of the vehicle 12, so that the lower surface 32 of the cooler body 24 is not visible. Accordingly, the cooler body 24 is effectively protected by the fins 86 from the muddy substances and other foreign matters splashed by the rear wheels 14. On the other hand, as shown in FIG. 11, that is, as seen backward of the vehicle 12 in the obliquely downward and leftward direction of the vehicle 12, the plurality of fins 86 arranged in the longitudinal direction of the vehicle 12 are spaced apart from each other to define a spacing between the adjacent fins 86, through which the air discharged from the lower surface 32 of the cooler body 24 is effectively exhausted along the fins 86 into the outside atmosphere in the obliquely downward and backward direction, owing to the negative air pressure generated at the lower open end of the air outlet 82 during forward running of the vehicle 12.

The undercover 28 has a front portion 92 which extends forwardly from the front end of the cooler body 24 to protect the cooler body 24, and downwardly from the lower end of the air outlet 82 so that the negative air pressure is generated within the air outlet 82, due to the air stream A generated during running of the vehicle 12. The undercover 28 further has a rear portion 94 which extends backward from the rear end of the cooler body 24 back to a position near the rear end of the vehicle 12, like the air inlet 50, to reduce the air resistance within the undercover 28 during running of the vehicle 12. The rear portion 94 has a part which projects upwardly and partially overlaps the cooler body 24 as seen forwardly of the vehicle 12 in the horizontal direction, as seen in the rear end elevational view of FIG. 5. However, the above-indicated part of the rear portion 94 has only a small area of overlap with the cooler body 24, so that the undercover 28 can be moved forwardly relative to the cooler body 24 upon application of a load to the undercover 28, without damaging of the cooler body 24 due to deformation of the above-indicated part.

The undercover 28 constructed as described above has a receptacle hole 100 formed near a boundary between the intermediate portion 80 and the rear portion 94. A resin clip 102 is pre-fixed in the receptacle hole 100. On the other hand, the rear surface 68 of the cooler body 24 has an attaching bracket 104 fixed to a central part of the rear surface 68. The undercover 28 is tentatively assembled with respect to the cooler body 24, with a single action to press the resin clip 102 into a fixing hole formed in the attaching bracket 104. Then, the undercover 28 is positioned with respect to the cooler body 24. It is noted that the attachment bracket 104 is not shown in FIG. 16. The undercover 28 has three other receptacle holes 106 in which resin clips 108 are fixed, and the resin clips 108 are fixed to the rear bumper 52. Like the resin clips 66 described above, the resin clips 102 and 108 are fixed into the respective fixing holes with their elastic deformation such that the resin clips 102 and 108 are not removable from the fixing holes. Thus, the undercover 28 is fixedly attached to the cooler body 24 and the rear bumper 52. The perspective view of FIG. 11 shows the resin clips 102 and 108 fixed in the respective receptacle holes 100 and 106.

The front portion 92 of the undercover 28 has two fixing holes 110. On the other hand, the front arm portion 42 of the cooler attachment bracket 22 has two cover fixing portions 112, as shown in FIG. 14. These cover fixing portions 112 are also indicated by "x" marks in FIG. 15. Bolts fixed to the lower surfaces of the cover fixing portions 112 are inserted through the fixing holes 110, so that the front portion 92 is fixed to the cooler attachment bracket 22 by the bolts and resin nuts 114 (shown in FIGS. 3 and 14). As shown in FIGS. 3 and 14, the two arm portions 42 provided in the front portion of the cooler attachment bracket 22 extend downwardly to a level below the cooler body 24, and the front end portions of these arm portions 42 function as the cover fixing portions 112. The bolts fixed to the lower surfaces of the cover fixing portions 112 so as to extend downwardly are inserted through the fixing holes 110, and the resin nuts 114 are screwed on the bolts.

At the cover fixing portions 112, there is a predetermined amount of gap between each of the two arm portions 42 and the undercover 28, as is apparent from FIG. 14. A suitable cushioning member such as a rubber member is inserted in this gap, to permit the undercover 28 to be vertically moved relative to the arm portions 42, for reducing an amount of an upward impact load which is applied upwardly to the undercover 28 during running of the vehicle 12 over stones scattered on the roadway surface or on raised or recessed parts of the roadway surface, and which is transmitted to the arm portions 42. Further, there is a predetermined spacing distance, such as, without limitation, 15 mm to 25 mm, or in some embodiments, approximately 20 mm, between the undercover 28 and the lower surface 32 of the cooler body 24 when the undercover 28 is attached to the arm portions 42, the cooler body 24 and the rear bumper 52 with the cover fixing portions 112 and the above-described resin clips 102 and 108. The above-described sealing member 88 has a thickness (vertical dimension) of, without limitation, not smaller than 20 mm so that the sealing member 88 fluid-tightly closes a spacing between the upper open end of the air outlet 82 and the lower surface 32 of the cooler body 24, so that the air discharged from the cooler body 24 can be adequately exhausted downwardly through the air outlet 82 into the outside atmosphere, while the fresh ambient air is introduced into the cooler body 24 through the air intake duct 26, under the negative air pressure generated within the air outlet 82, whereby the cooling device 10 of the differential pressure air introducing type maintains a high degree of air cooling performance even in the presence of the above-indicated gap and spacing distance. In addition, elastic deformation of the sealing member 88 reduces an amount of impact load which is applied upwardly to the undercover 28 and which is transmitted to the cooler body 24, and accordingly reduces a degree of damaging of the cooler body 24 due to the impact load.

A strength of attachment of the undercover 28 to the cooler body 24 with the resin clip 102 is sufficiently lower than a strength of attachment of the cooler body 24 to the cooler attachment bracket 22 with the four fixing bolts 41. Described in detail, upon application of an impact load Fr to the rear portion 94 of the undercover 28 upon collision of the vehicle 12 on the rear side, the resin clip 102 is broken before the cooler body 24 is damaged due to the impact load Fr transmitted to the cooler body 24 through the resin clip 102, so that the undercover 28 is removed from the cooler body 24, and is moved forwardly relative to the cooler body 24, whereby the impact load Fr acting on the cooler body 24 is reduced. Further, a strength of attachment of the undercover 28 to the rear bumper 52 and the cooler attachment bracket 22 with the three resin clips 108 and the two cover fixing portions 112 is sufficiently lower than a strength of attachment of the cooler body 24 to the cooler attachment bracket 22 with the four fixing bolts 41, so that the resin clips 108 and the resin nuts 114 are broken before the cooler body 24 is damaged due to the impact load Fr transmitted to the cooler body 24 through the arm portions 42, and the undercover 28 is removed from the rear bumper 52 and the cooler attachment bracket 22, whereby the impact load Fr acting on the cooler body 24 is reduced. Accordingly, the cooling device 10 permits reduction of damaging of the cooler body 24 and prevention of leakage of the oil upon comparatively light collision of the vehicle 12 with the vehicle following the vehicle 12 or the object located backward of the vehicle 12, without direct collision of the cooler body 24 with the other vehicle or the backward located object.

The vehicle 12 according to the present disclosure is configured such that the undercover 28 disposed below the cooler body 24 has the air outlet 82 which is formed through the undercover 28 so as to extend in the vertical direction and through which the ambient air discharged through the lower surface 32 of the cooler body 24 is exhausted downwardly into the outside atmosphere. The undercover 28 is provided with the plurality of fins 86 disposed within the air outlet 82 such that the fins 86 are spaced apart from each other in the longitudinal direction of the vehicle 12, and such that each of the fins 86 extends in the width direction of the vehicle 12 and is inclined such that the lower end of the fin 86 is located backward of the upper end in the longitudinal direction of the vehicle 12. Accordingly, the air discharged through the lower surface 32 of the cooler body 24 can be adequately exhausted into the outside atmosphere along the plurality of fins 86, and the cooler body 24 can be adequately protected from splashes from the rear wheels 14, by suitably determining the length dimensions L, inclination angles α and spacing distances d of the plurality of fins 86.

The vehicle 12 is further configured such that the length dimension L of at least one of the fins 86 which is comparatively distant from the rear wheels 14 is smaller than that of at least one of the fins 86 which is comparatively near the rear wheels 14. Accordingly, the front portion of the cooler body 24 which is comparatively near the rear wheels 14 can be adequately protected from the splashes from the rear wheels 14, by the fin 86 or fins 86 having the comparatively large length dimension L or dimensions L. Further, the rear portion of the cooler body 24 which is less likely to be subjected to the splashes and has a comparatively small angle of exposure to the splashes (i.e. horizontal-like splashes) has a reduced air resistance owing to the fin 86 or fins 86 having the comparatively small length dimension L or dimensions L, so that the air discharged from the cooler body 24 can be more smoothly exhausted into the outside atmosphere, whereby the cooling performance of the cooling device 10 can be improved.

The vehicle 12 is also configured such that the plurality of fins 86 are spaced apart from each other by the predetermined distance d, so that the air discharged from the cooler body 24 can be more adequately exhausted into the outside atmosphere.

The vehicle 12 is further configured such that the cooler body 24 has the flat box outer configuration having the upper and lower surfaces 30 and 32 having relatively large areas which are located below the floor panel 20 of the vehicle 12 and are substantially parallel to the horizontal plane and each of which has the large area, so that the ambient air is introduced into the cooler body 24 through the upper surface 30, and is discharged from the cooler body 24 through the lower surface 32. Accordingly, the cooler body 24 can be disposed compactly in a small space below the floor panel 20, and the ambient air for cooling the coolant can efficiently flow into the cooler body 24 through the upper surface 30 and from the cooler body 24 through the lower surface 32, whereby the cooling device 10 has a high degree of air cooling performance.

The vehicle 12 is also configured such that the undercover 28 is disposed such that the upper open end of the air outlet 82 is held in fluid-tight contact with the lower surface 32 of the cooler body 24, so that the ambient air discharged from the cooler body 24 is exhausted through the air outlet 82 into the outside atmosphere, while the fresh ambient air is introduced from the air intake duct 26 into the cooler body 24, under the negative air pressure generated at the lower open end of the air outlet 82 due to the air stream A generated during running of the vehicle 12. The cooling device 10 of the vehicle 12 is of the differential pressure air introducing type wherein the plurality of fins 86 are disposed within the air outlet 82 such that the fins 86 are spaced apart from each other in the longitudinal direction of the vehicle 12 and are inclined such that the lower end of each fin 86 is located backward of its upper end in the longitudinal direction of the vehicle 12. Accordingly, the ambient air discharged from the cooler body 24 can be smoothly exhausted into the outside atmosphere, owing to a function of the fins 86 to rectify the air stream A, and under the negative air pressure at the lower open end of the air outlet 82, whereby the cooling performance of the cooling device 10 can be more improved.

The vehicle 12 is further configured such that the cooling device 10 comprises the air intake duct 26 which is disposed in fluid-tight contact with the upper surface 30 of the cooler body 24 and which has the air inlet 50 formed in the end portion of the air intake duct 26, so that the fresh ambient air is introduced through the air inlet 50 into the air intake duct 26 and introduced from the air intake duct 26 into the cooler body 24 through the upper surface 30 when the ambient air discharged from the cooler body 24 is exhausted through the air outlet 82 into the outside atmosphere under the negative air pressure generated at the lower open end of the air outlet 82. Accordingly, the ambient air smoothly flows through the cooler body 24 to efficiently cool the coolant, such that the ambient air introduced into the cooler body 24 through the upper surface 30 flows downwardly through the cooler body 24, and is discharged from the cooler body 24 through the lower surface 32. In this respect, it is particularly noted that the cooler body 24 having the flat box outer configuration has the comparatively large upper surface 30 through which the ambient air is introduced into the cooler body 24 and has the comparatively large lower surface 32 through which the ambient air is discharged from the cooler body 24, so that the cooling performance of the cooling device 10 is further improved. Further, the cooling device 10 including the air intake duct 26 and the undercover 28 can be compactly disposed in a space below the floor panel 20 of the vehicle 12.

Additional embodiments will be described. It is to be understood that the same reference signs as used in the first embodiment will be used in the following embodiments, to identify the corresponding elements, which will not be described redundantly.

Figure 17:
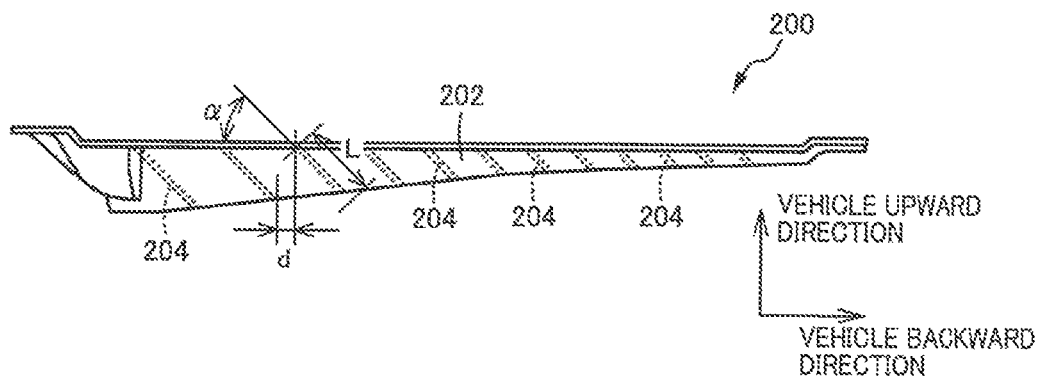
FIG. 17 is a left side elevational view of an undercover of a cooling device of a vehicle according to another embodiment of the present disclosure.
Figure 18:
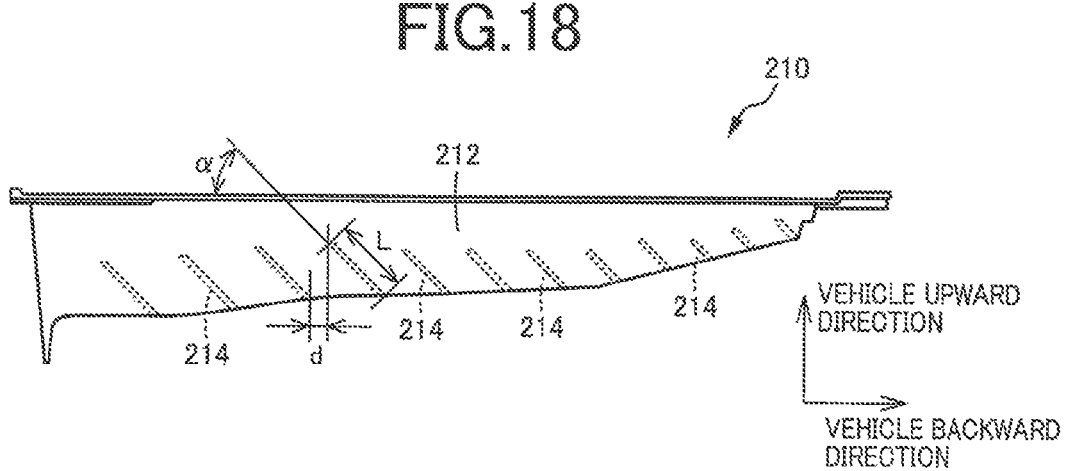
FIG. 18 is a left side elevational view of an undercover of a cooling device of a vehicle according to a further embodiment of the present disclosure.

FIGS. 17 and 18 are the side elevational views of undercovers 200 and 210 of cooling devices of vehicles according to respective other embodiments and each correspond to FIG. 9 of the other embodiments. The undercovers 200 and 210 have respective air outlets 202 and 212 in the form of a rectangular frame, which are held in fluid-tight contact with the lower surface 32 of the cooler body 24. The air outlets 202 and 212 are formed so as to extend in the vertical direction, such that the ambient air discharged from the cooler body 24 through the lower surface 32 is exhausted downwardly into the outside atmosphere through the air outlets 202 and 212. Further, a plurality of fins 204 and 214 are disposed within the respective air outlets 202 and 212 such that the fins 204, 214 are spaced apart from each other in the longitudinal direction of the vehicle 12 and such that each fin 204, 214 extends in the width direction of the vehicle 12 and is inclined at a predetermined angle α such that a lower end of the fin 204, 214 is located backward of its upper end in the longitudinal direction of the vehicle 12. The fins 204 and 214 are flat plates which are spaced apart from each other by a predetermined distance d in the longitudinal direction of the vehicle 12 such that two adjacent fins 86 in the vehicle longitudinal direction are not overlapped each other in the vehicle vertical direction, and have length dimensions L determined such that the length dimensions of the fins 204, 214 comparatively distant from the rear wheels 14 are smaller than those of the fins 204, 214 comparatively near the rear wheels 14. It is noted that the undercovers 200 and 210 are not provided with portions equivalent to the front and rear portions 92 and 94 of the undercover 28 in other embodiments, and consist mainly of structures defining the air outlets 202 and 212.

The air outlet 202 of FIG. 17 has a comparatively small dimension of downward extension, and the dimension of downward extension decreases continuously in the backward direction of the vehicle 12. The plurality of fins 204 extend from the upper open end to the lower open end of the air outlet 202. On the other hand, the air outlet 212 of FIG. 18 has a larger dimension of downward extension than the air outlet 202 of FIG. 17, and the dimension of downward extension decreases continuously and in steps. The plurality of fins 214 are disposed in a lower portion of the air outlet 212, along the lower open end of the air outlet 212. The inclination angles α, distances d and length dimensions L of the fins 204 and 214 are suitably determined so as to minimize disturbance of downward flows of the air through the air outlets 202 and 212 while preventing entry of splashes from the rear wheels 14 into the air outlets 202 and 212. These undercovers 200 and 210 have substantially the same advantages as the undercover 28 in the first embodiment. The undercover 200 of FIG. 17 having the comparatively small dimension of downward extension can be configured to have an accordingly reduced weight, and a suitable spacing distance to the roadway surface.

While the fins 86, 204 and 214 in the illustrated embodiments have the predetermined inclination angle α, the inclination angle α may be changed continuously or in steps depending upon the position of the fins. Further, the distance d between the fins may also be changed continuously or in steps. It is also noted that the adjacent fins 86, 204, 214 may be disposed so as to partially overlap each other in the running direction of the vehicle 12, such that the distance d may have a negative value. It is further noted that all of the fins 86, 204, 214 may have the same length dimension L, irrespective of the positions of the fins in the running direction of the vehicle.

While some embodiments of the present disclosure have been described in detail by reference to the drawings, for illustrative purpose only, it is to be understood that the present disclosure may be embodied with various other modifications and improvements, which may be apparent to those skilled in the art.

What is claimed is:

1. A vehicle comprising rear wheels, and a heat exchanging type cooling device through which a coolant flows and which includes a cooler body disposed backward of the rear wheels in a longitudinal direction of the vehicle and in a lower portion of the vehicle, wherein an ambient air introduced into the cooler body to cool the coolant with heat exchanging between the coolant and the ambient air is discharged downwardly through a lower surface of the cooler body, the cooling device comprising:
an undercover disposed below the cooler body and having an air outlet through which the ambient air discharged through the lower surface of the cooler body is exhausted downwardly into outside atmosphere, the air outlet being formed through the undercover so as to extend in a vertical direction,
and wherein the undercover is provided with a plurality of fins disposed within the air outlet such that the plurality of fins are spaced apart from each other in the longitudinal direction of the vehicle, each of the plurality of fins extending in a width direction of the vehicle and being inclined such that a lower end of each of the plurality of fins is located backward of its upper end in the longitudinal direction of the vehicle.

2. The vehicle according to claim 1, wherein a length dimension of at least one of the plurality of fins which is comparatively distant from the rear wheels is smaller than that of at least one of the plurality of fins which is comparatively near the rear wheels.

3. The vehicle according to claim 1, wherein the plurality of fins are spaced apart from each other in the longitudinal direction of the vehicle by a predetermined distance.

4. The vehicle according to claim 1, wherein the cooler body has a flat box outer configuration having an upper surface and the lower surface which are located below a floor panel of the vehicle and are substantially parallel to a horizontal direction and each of which has a large area, and wherein the ambient air is introduced into the cooler body through its upper surface, and is discharged from the cooler body through its lower surface.

5. The vehicle according to claim 1, wherein the undercover is disposed such that an upper open end of the air outlet is held in fluid-tight contact with the lower surface of the cooler body, the ambient air discharged from the cooler body is exhausted through the air outlet into the outside atmosphere, while a fresh ambient air is introduced into the cooler body, under a negative air pressure generated at a lower open end of the air outlet due to an air stream generated during running of the vehicle.

6. The vehicle according to claim 5, wherein the cooling device further comprises an air intake duct which is disposed in fluid-tight contact with an upper surface of the cooler body and which has an air inlet formed in its end portion, so that the fresh ambient air is introduced through the air inlet into the air intake duct and introduced from the air intake duct into the cooler body through the upper surface when the ambient air discharged from the cooler body is exhausted through the air outlet into the outside atmosphere under the negative air pressure generated at the lower open end of the air outlet.

7. The vehicle according to claim 1, wherein the air outlet is formed through the undercover so as to overlap the lower surface of the cooler body in the vertical direction.

* * * * *

UNITED STATES PATENT AND TRADEMARK OFFICE
CERTIFICATE OF CORRECTION

PATENT NO. : 10,828,978 B2  
APPLICATION NO. : 16/263997  
DATED : November 10, 2020  
INVENTOR(S) : Koichi Nakamura, Tomoaki Furukawa and Kiyonori Takagi Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Miyoshi" and insert --Miyoshi-shi Aichi--, therefor.

Item (72), inventor 2, city, delete "Toyota" and insert --Toyota-shi Aichi--, therefor.

Item (72), inventor 3, city, delete "Okazaki" and insert --Okazaki-shi Aichi--, therefor.

Item (73), assignee, city, delete "Toyota" and insert --Toyota-shi Aichi-ken--, therefor.

In the Specification

In Column 11, Line(s) 8, delete "bolls" and insert --bolts--, therefor.

In Column 11, Line(s) 35, delete "right ward" and insert --rightward--, therefor.

In Column 11, Line(s) 37, delete "2S" and insert --28--, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*